US006771399B1

(12) United States Patent
Batten

(10) Patent No.: US 6,771,399 B1
(45) Date of Patent: Aug. 3, 2004

(54) INJECTION MOLDED PLASTIC POSITIONING SYSTEM FOR MOVING CARRIAGE FLATBED SCANNER

(75) Inventor: Patrick A Batten, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/416,013

(22) Filed: Oct. 8, 1999

(51) Int. Cl.$^7$ ............................................... H04N 1/04
(52) U.S. Cl. ..................... 358/497; 358/498; 358/494; 358/474
(58) Field of Search ................... 358/497, 498, 358/474, 484, 494, 426.03, 425, 296; 359/806

(56) References Cited

U.S. PATENT DOCUMENTS

| | | | | |
|---|---|---|---|---|
| 4,076,391 A | * | 2/1978 | Teiser et al. | 359/806 |
| 4,413,287 A | * | 11/1983 | Torpie et al. | 358/426.03 |
| 4,711,346 A | * | 12/1987 | Breher et al. | 198/850 |
| 5,311,330 A | * | 5/1994 | Yeh | 358/498 |
| 5,516,055 A | * | 5/1996 | Gerfast et al. | 242/340 |
| 5,634,378 A | * | 6/1997 | Burkhardt et al. | 74/501.5 R |
| 5,691,826 A | * | 11/1997 | Yeh et al. | 358/498 |
| 5,893,908 A | * | 4/1999 | Cullen et al. | 707/5 |
| 5,999,277 A | * | 12/1999 | Tsai | 358/498 |
| 6,005,686 A | * | 12/1999 | Hong | 358/497 |

* cited by examiner

Primary Examiner—Edward Coles
Assistant Examiner—Heather D Gibbs

(57) ABSTRACT

A system, method and apparatus for translating a carriage from one position to another position utilizing an injection molded plastic translating system are disclosed. In a preferred embodiment, an injection molded plastic translating system is utilized within a flatbed scanner to translate a scanhead carriage along a desired path during the scanning process. The plastic translating system is formed utilizing gas injection molding techniques, resulting in a plastic translating system that does not warp. Further, the plastic translating system is smooth to allow the scanhead carriage to be translated with substantially no vibration. Also, the plastic translating system of a preferred embodiment results in very little wear after many translations of the carriage. Because the plastic translating system of a preferred embodiment may be molded as part of the base of the scanner or as part of a platform that is utilized within the scanner, the total number of parts utilized within the scanner is reduced and the total cost for assembling such scanner is reduced. Moreover, the injection molded plastic translating system disclosed herein may be utilized for many other types of devices that require a component to be translated from one position to another along a desired path.

20 Claims, 1 Drawing Sheet

INJECTION MOLDED PLASTIC POSITIONING SYSTEM FOR MOVING CARRIAGE FLATBED SCANNER

TECHNICAL FIELD

The invention relates in general to an injection molded plastic translating system, and in specific to an injection molded plastic translating system for the carriage of a flatbed scanner.

BACKGROUND

Optical scanners are available in the prior art that can read text or illustrations printed on paper and translate the information into a form that is recognizable by a computer. Generally, a scanner works by digitizing an image, i.e., dividing the image into a grid of boxes and representing each box with either a zero or a one, depending on whether the box is filled in (for color and gray scaling, the same principle applies, but each box is then represented by up to 24 bits.) The resulting matrix of bits, called a bit map, can then be stored in a file, displayed on a screen, manipulated by programs, or otherwise used.

Some scanners are small hand-held devices that a user moves across the paper to be scanned. These hand-held scanners are often called "half-page scanners" because they typically can only scan 2 to 5 inches at a time. Accordingly, such hand-held scanners are adequate for small pictures and photos, but are difficult to use for scanning an entire page of text or graphics. Large scanners, called "flatbed scanners," are also available, which are typically similar to photocopy machines. Such a flatbed scanner generally comprises a board (or "platen") on which a user can lay books, magazines, and other documents to be scanned, and a scanhead apparatus or "carriage" which generally moves along the document scanning the document. For example, a typical flatbed scanner comprises a glass (or otherwise transparent) board on which a document to be scanned is placed. The flatbed scanner also comprises a carriage beneath the glass board, which moves beneath the glass scanning the document on the glass board.

In the prior art, metal rods are typically used for transporting the scanner's carriage during the scanning process. That is, typically either a machined rod or a stamped sheet metal part is provided in the scanner over which the carriage slides during the scanning process. More specifically, a flatbed scanner of the prior art typically comprises a glass board on which a document to be scanned is placed, and a carriage, which is generally located 2 or 3 millimeters beneath the glass board. Additionally, prior art flatbed scanners typically comprise 2 metal rods, usually one on either side of the scanner, from which the carriage is suspended or on which the carriage is resting. During operation of prior art flatbed scanners, a drive system, such as a belt, causes the carriage to travel along the metal rods to scan the document on the glass board. Typically, plastic bearings are utilized in the prior art to aid the carriage in traveling along the metal rods during operation of such prior art flatbed scanner.

Several problems exist with the prior art metal rods of flatbed scanners. First, the metal rods are relatively expensive parts within a flatbed scanner. Generally, most of the flatbed scanner is made of materials other than metal, such as plastic. Additionally, the metal rods increase the complexity of constructing or manufacturing the flatbed scanners. That is, when utilizing an assembly line for constructing flatbed scanners, an assembly station is typically dedicated to installing the metal rods within the scanners. Thus, the metal rods are separate component parts that must be assembled as part of the scanner. Because the metal rods are separate component parts requiring additional assembly, cost for such parts and labor required for assembly increase the overall cost to produce the flatbed scanner. Moreover, the plastic bearings utilized with the metal rods rapidly wear down, changing the dimensional accuracy of the scanner.

Similar problems exist in many devices other than flatbed scanners, which use metal rods or other metal components to translate a component of such device from one location or position to another. For example, many photocopiers have a mechanism similar to the carriage described above for flatbed scanners. That is, photocopiers typically comprise a glass platen upon which a document to be copied may be placed, and a mechanism that moves beneath the glass platen to copy the document. Likewise, many printers comprise a print head that moves from side to side along metal rods when printing to a document. Accordingly, the above problems are present in many devices that comprise metal rods or other metal components that are used for translating or transporting a component of the device from one location or position to another.

Plastic is an optional material available for use in place of metal in prior art translating systems. However, plastic has not been a viable alternative to the prior art metal translating systems because of plastic's tendency to warp. Because plastic tends to warp significantly, plastic has not been successfully utilized within prior art translating systems. That is, when plastic used for a translating system warps, the plastic may no longer be suitable for translating a component as desired. Thus, plastic translating systems capable of being utilized within devices, such as flatbed scanners, which require translating a component from one position to another in a relatively smooth and accurate manner, have not been successfully developed in the prior art. Accordingly, metal translating systems continue to be used in the prior art.

SUMMARY OF THE INVENTION

In view of the above, there exists a desire for a method, apparatus and system for translating a component of a device, such as a carriage in a flatbed scanner, from one position or location to another position or location. Many devices exist which contain components that must be translated or transported from one location or position to another, such as a carriage in a flatbed scanner, a photocopying mechanism in a photocopier, and a print head in a printer. A desire exists for a method, apparatus and system for translating or transporting such components from one location or position to another.

A further desire exists for a method, apparatus and system for translating a component or mechanism from one location or position to another, wherein such method, apparatus and system are relatively inexpensive. A further desire exists for a method, apparatus and system for translating a component or mechanism from one location or position to another, wherein such method, apparatus and system translate such a component with very little wear or deterioration caused by friction. Still a further desire exists for a method, apparatus and system for translating a component or mechanism from one location or position to another, wherein such method, apparatus and system provide relatively easy assembly of such translating apparatus. Yet a further desire exists for a method, apparatus and system for translating a component or mechanism of a device from one location or position to another utilizing plastic to accomplish such translating in a desired manner.

These and other objects, features and technical advantages are achieved by a method, apparatus and system which utilize an injection molded plastic positioning system to translate a component (or carriage) from one location or position to another. In a preferred embodiment, a rail platform (or "base") is provided within a flatbed scanner (or other device), wherein such platform is plastic that is molded into a desired shape using a gas injection molding process to allow translation of the scanner head carriage (or other component) along such platform.

As used herein, the term "carriage" refers to a transporting mechanism used to translate a component of a device from one location or position to another. Additionally, the term "carriage" comprises a component of a device that translates from one position or location to another. For example, suppose a printer comprises a carrying mechanism (e.g., a basket or cradle) for translating a print head. A user may replace the print head by removing such print head from the carrying mechanism and inserting a new print head in its place. During the printer's operation the carrying mechanism carries the print head as it is translated from one position to another. The term "carriage" is intended to comprise such a carrying mechanism used to carry a component along a desired translating path. As a further example, suppose a printer comprises a print head, wherein such print head is capable of being translated in the printer without requiring a carrying mechanism. For example, such print head may have a built-in mechanism that permits such print head to be translated along a desired path in the printer. The term "carriage" is intended to comprise such a component, as the print head, that does not require a carrying mechanism for translation.

It should be appreciated that a technical advantage of one aspect of the present invention is that a method, apparatus and system for translating a component or device utilizing a gas injected molded plastic positioning system (or translating system) to accomplish such translation are provided. Further, a technical advantage of one aspect of the present invention is that the effort and time required for assembly of devices requiring a translating system, such as a flatbed scanner, are reduced. That is, very little time and effort are required for assembling a device, such as a flatbed scanner, requiring a translating system because the translating system may be molded as part of such device, requiring very little or no assembly thereafter. Further, a technical advantage of one aspect of the present invention is that wear of the translating system is less than the wear of prior art metal translating mechanisms (e.g., metal rods). Thus, an increased life span of the translating system may be achieved by a preferred embodiment. Additionally, a technical advantage of one aspect of the present invention is that a relatively inexpensive translating method, system and apparatus are provided.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
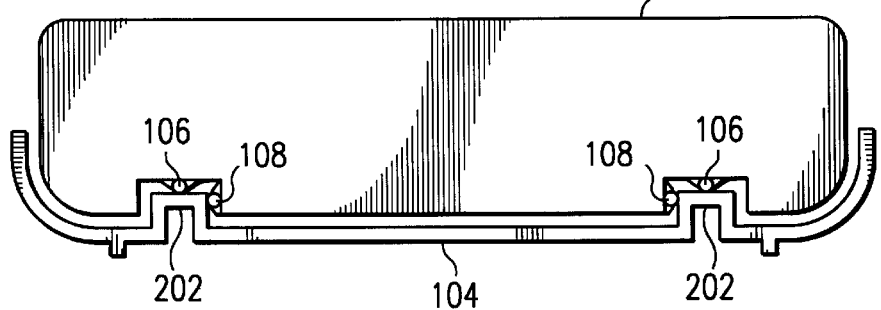
FIG. 1 shows a frontal view of a preferred embodiment for an injection molded plastic translating system.

The present invention comprises a novel method, apparatus and system for translating or transporting a component from one position or location to another. The following description is presented to enable any person skilled in the art to make and use the invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

In a preferred embodiment, a molded plastic translating system is used within a flatbed scanner to translate the scanner's scanhead carriage from one position or location to another during the scanning process. In such a preferred embodiment the molded plastic translating system works to position or guide the scanhead carriage along the path that the scanhead carriage travels to scan a document. Additionally, in a preferred embodiment, the molded plastic translating system works to guide the scanhead carriage along a linear, unbroken path (or "route" or "course"), as apposed to a device, such as a robotic arm, picking up the carriage and translating it to another position.

In the prior art, molded plastic parts typically had some significant warp in them out of the mold. Additionally, as the plastic "de-stressed" over time, the plastic would typically warp further. For example, plastic is typically heated and molded into a desired form. Thereafter, the plastic cools and hardens. Generally, the outer layers of the plastic will cool more quickly than the inner layers. Thus, the outer layers of the plastic typically harden before the inner layers. Typically, when the inner layers of the plastic harden they create stress that is "tugging" on the already hardened outer layers. Such stress typically exists within molded plastic which causes the plastic to tend to warp. As the plastic later "de-stresses," the plastic warps. For example, if the plastic later heats up, the outer layers may weaken and concede to the stress presented by the inner layers, resulting in warpage.

Such warping caused significant problems in using plastic parts for translating systems because often the warping would result in the system being unable to translate components as desired. For example, suppose that a plastic translating system molded utilizing techniques of the prior art (such that stress is present in the plastic) is placed in a flatbed scanner. As the translating system is heated, such as during shipment to a particular location or during usage, the plastic warps. As a result of such warping, the scanhead carriage is unable to translate along its path in a desired manner, which often results in reduced quality in scanning. That is, because of the plastic translating system being warped, the scanhead carriage is unable to translate along its path in an accurate manner to scan the document as desired.

Techniques have been recently developed for molding plastic in a manner that reduces the stress present in the molded plastic, and thus reduces warping. One such technique is injection molding. In a preferred embodiment, a gas injection molding process is utilized to mold the plastic translating system, which results in a plastic translating system that is substantially stress-free and therefore does not warp. With gas injection molding, the plastic part is filled with gas, such as nitrogen, during the molding process, and thereafter the gas is typically let out. The gas maintains outward pressure on the plastic mold, which aids the plastic in maintaining the molded shape as it cools. That is, plastic often pulls away from the mold as it cools, but the injected gas aids the plastic in maintaining its molded form while cooling. Additionally, the injected gas allows the inner layers of the plastic to cool quickly, wherein such layers may cool at substantially the same rate as the outer layers. Because the gas maintains outward pressure as the plastic cools and allows the inner layers to cool more quickly, the resulting molded plastic has little or no stress. Accordingly, by using a gas injection molding process, molded in stress can be eliminated from a plastic translating system, resulting in such system maintaining its desired form. Therefore, a gas injection molded plastic translating system can be used within a flatbed scanner or other device requiring a translating system, such as a printer or photocopier, with great accuracy in translating in a desired manner.

It was anticipated that a plastic translating system would have greater wear or deterioration at a faster rate than metal translating systems of the prior art. However, a preferred embodiment actually results in much less wear. For example, significant wear in plastic bearings used with metal rods typically used in prior art flatbed scanners can be noticed after approximately 100,000 to 200,000 scans (or translations of the scanhead carriage along the metal translating system). Initial studies for a preferred embodiment of a plastic translating system for a flatbed scanner have resulted in little or no such wear after approximately 1 million scans. Accordingly, because of the reduction in wear, a preferred embodiment plastic translating system is much more durable and has a longer life than prior art metal translating systems. Moreover, because of such reduction in wear, the scanner's translating system remains dimensionally accurate for a much longer period of time than with prior art scanner.

Turning to FIG. 1, a frontal view of a preferred embodiment for a gas injection molded plastic translating system for a flatbed scanner is provided. As shown, a scanhead carriage 102 is provided which translates along the plastic translating system 104. In a preferred embodiment, translating system 104 is part of the base of the flatbed scanner, or translating system 104 is a platform provided within the scanner. In either case, a preferred embodiment of the translating system 104 can be molded as part of the scanner, thus reducing the overall number of parts required and the cost of such scanner. For example, the translating system 104 may be molded such that it couples from one end of the scanner's frame to the other end.

In a preferred embodiment, bearings 106 and/or 108 are also provided to assist in translating scanhead carriage 102 along the rails 202 of translating system 104. Bearings 106 and/or 108 are coupled to the bottom of scanhead carriage 102, and such bearings 106 and/or 108 result in very little wear in the plastic translating system 104. Moreover, in a preferred embodiment, the translating system 104 results in very little wear in bearings 106 and/or 108. In a preferred embodiment, bearings 106 aid the carriage 102 in translating along the rails 202 with a downward force (e.g., gravity) that may be applied to the carriage 102. Additionally, in a preferred embodiment, the applied force required to move the carriage 102 during operation of the scanner may cause the carriage 102 to try to twist. Thus, bearings 108 may be implemented within a preferred embodiment to assist the carriage 102 in translating along rails 202 in response to such applied force to the carriage 102.

In a preferred embodiment, lubricated plastic alloys are used for bearings 106 and/or 108. That is, bearings 106 and/or 108 are made of a lubricated plastic material, such as provided by Lubralloy. Most lubricating plastic alloys consist of a structural component, such as nylon, polycarbonate, ABS, etcetera, with a lubricant such as PTFE (it should be noted that Teflon is a brand of PTFE). Any such lubricating plastic alloys may be utilized in a preferred embodiment. As examples, polycarbonate and nylon based teflon bearings utilized with polycarbonate rails, polycarbonate/ABS rails, and High Impact Polystyrene rails may be utilized in a most preferred embodiment.

Such bearings 106 and/or 108 have been used in the prior art along with the prior art metal translating systems. As discussed above, such bearings wear down at a very fast rate in prior art metal translating systems in comparison with a preferred embodiment of the plastic translating system disclosed herein. The faster rate at which bearings wear down in prior art metal translating systems wear down may be partially explained by the fact that a coating is typically added to such metal translating systems to prevent rusting. Such coating adds texture to the metal translating system, similar to that of sandpaper or a file. Thus, with each translation the metal's texture causes friction that results in deterioration of the bearings used in conjunction with such a metal translating system.

However, in a preferred embodiment of the present invention the plastic translating system may be molded in a manner that produces a very smooth finish on the plastic. That is, the mold from which the plastic system is formed is very smooth, which results in the produced plastic translating system being very smooth. Such a smooth translating system of a preferred embodiment results in very little wear in the bearings 106 and/or 108, thus prolonging the life of such bearings, as well as the life of the scanner scanning accurately. In a most preferred embodiment, the translating system is molded such that the carriage interacts well with the rails to allow for smooth translation, without requiring any bearings 106 and/or 108. In a preferred embodiment, the mold produces a smooth plastic translating system without requiring any coating or additional smoothing to the resulting molded plastic translating system. Although, in alternative embodiments, additional lubricant coating may be added to the molded plastic translating system and/or additional smoothing techniques may be performed on the molded plastic translating system after being molded. Because the plastic translating system in the preferred embodiment is so smooth, wear on the system is reduced. Additionally, the scanhead carriage 102 is capable of moving along the translating system smoothly without incurring undue vibrations, which if incurred would result in a scanned image having poor quality. It is important for flatbed scanners, as well as other devices, that a carriage be translated in a substantially smooth manner. If the scanhead of a scanner is not translated in a substantially smooth manner, the resulting image can lack quality and resolution.

In a preferred embodiment, the plastic translating system 104 is compatible with the carriage 102. "Compatible" is defined as "capable of existing together in harmony" or "designed to work with another device or system without modification." MERRIAM-WEBSTER'S COLLEGIATE DICTIONARY 366 (Deluxe ed. 1998). As shown in FIG. 1, carriage 102 is compatible with translating system 104. For example, carriage 102 fits on guides 202 of the translating system 104 in a manner that carriage 102 can be translated along such guides 202. Moreover, in a preferred embodiment, guides 202 work to position (or "align") the carriage 102 as desired during translation of the carriage 102.

Figure 2:
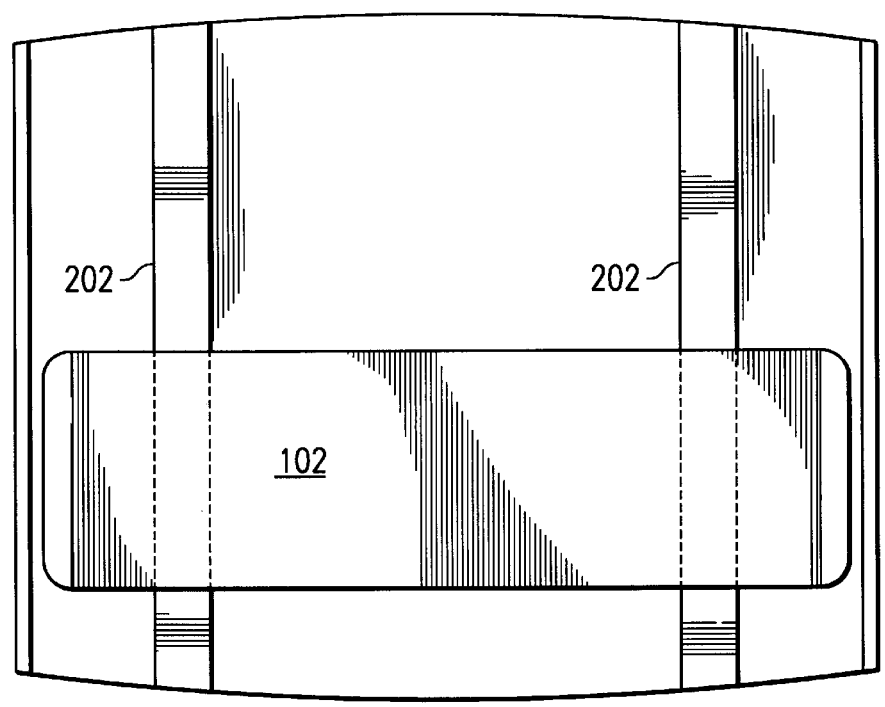
FIG. 2 shows a top view of a preferred embodiment for a flatbed scanner comprising a plastic translating system.

Turning to FIG. 2, a top view of a preferred embodiment for a flatbed scanner comprising a plastic translating system is provided. As shown, scanhead carriage 102 can move along the rails (or "guides") 202 of the plastic translating system 104 to scan a document placed on the transparent platen (not shown) located just above scanhead carriage 102. The plastic guides 202 assist in positioning scanhead carriage 102 as it is translated during the scanning process.

Figure 3:
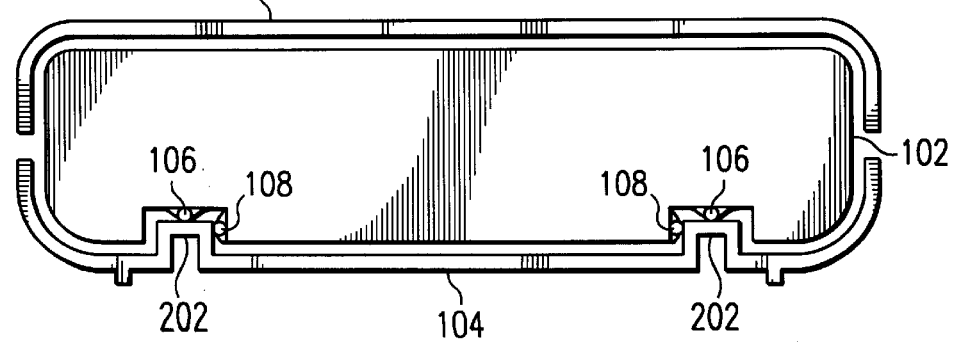
FIG. 3 shows a frontal view of a preferred embodiment for an injection molded plastic translating system for a flatbed scanner.

Turning to FIG. 3, a frontal view of a preferred embodiment for a flatbed scanner comprising a plastic translating system is provided. In FIG. 3, transparent platen 302 is located above scanhead carriage 102. In a preferred embodiment, a user can place a document to be scanned on platen 302. Scanhead carriage 102 can then translate along rails 202 of plastic translating system 104 to scan the document on platen 302. In a preferred embodiment, very little space is provided between transparent platen 302 and scanhead carriage 102. For example, transparent platen 302 may be approximately 1 to 2 millimeters in distance above scanhead carriage 102. Because the plastic translating system is stable and does not tend to warp, the scanhead carriage 102 can be positioned very close to the transparent platen 302 without the danger of such scanhead carriage 102 jamming against transparent platen 302 due to the plastic translating system warping.

It should be understood that a preferred embodiment of the present invention can be utilized for many types of devices requiring a translating system, and any such device is intended to be within the scope of the present invention. The present invention is not intended to be limited only to the devices discussed herein (e.g., flatbed scanners, printers, photocopiers), rather such devices are intended as examples that render the disclosure enabling for many other devices that utilize a translating system. Most preferably, a preferred embodiment of the present invention is utilized within a flatbed scanner. Alternatively, the preferred embodiment can be utilized within another device or system for generating an image. As used herein "generating" comprises creating an original image (as with a printer) and/or copying an image (as with a photocopier). Also, as used herein, "image" comprises both text and pictorial images. As still a further alternative, the preferred embodiment can be utilized within still other devices or systems that are unrelated to generating an image. For example, systems that require a carriage to be translated in a substantially smooth manner from one position or location to another along a desired guide, can utilize a preferred embodiment of the injection molded plastic translating system disclosed herein.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of translating a carriage of a device from a first position to a second position utilizing a plastic translating system, said method comprising:

providing a molded plastic guide that is compatible with said carriage, wherein said molded plastic guide is formed from injection molding; and translating said carriage of said device from said first position to said second position along said molded plastic guide.

2. The method of claim 1, wherein said injection molding is gas injection molding.

3. The method of claim 1, wherein said carriage is a scanhead carriage of a flatbed scanner.

4. The method of claim 1, wherein said plastic guide is smooth to allow said translating of said carriage to be accomplished substantially free from vibration to said carriage.

5. The method of claim 1, wherein at least one bearing is used to assist in translating said carriage along said molded plastic guide.

6. The method of claim 5, wherein said at least one bearing is a lubricated plastic alloy material.

7. The method of claim 1, wherein said translating of said carriage along said guide is accomplished in a substantially frictionless manner between said carriage and said guide.

8. A plastic translating system for translating a carriage of a device from a first position to a second position, said plastic translating system comprising:

a plastic guide molded from injection molding, wherein said plastic guide is compatible with said carriage to translate said carriage from said first position to said second position.

9. The plastic translating system of claim 8, wherein said injection molding is gas injection molding.

10. The plastic translating system of claim 8, wherein said carriage is a scanhead carriage of a flatbed scanner.

11. The plastic translating system of claim 8, wherein said plastic guide is smooth to allow said translating of said carriage to be accomplished substantially free from vibration to said carriage.

12. The plastic translating system of claim 8, further comprising:

at least one bearing to assist in translating said carriage along said plastic guide.

13. The plastic translating system of claim 12, wherein said at least one bearing is a lubricated plastic alloy material.

14. A system for generating an image, said system comprising:

a movable carriage that is translated from a first position to a second position during image generation; and a plastic translating system, said plastic translating system compatible with said movable carriage to translate said movable carriage from said first position to said second position, wherein said plastic translating system is formed using injection molding.

15. The system of claim 14, wherein said injection molding is gas injection molding.

16. The system of claim 14, wherein said carriage is a scanhead carriage of a flatbed scanner.

17. The system of claim 14, further comprising:
a plastic guide to position said carriage as said carriage is translated from said first position to said second position, wherein said plastic guide is smooth to allow said carriage to be translated substantially free from vibration to said carriage.

18. The system of claim 14, further comprising:
at least one bearing to assist in translating said carriage along said plastic translating system.

19. The system of claim 18, wherein said at least one bearing is a lubricated plastic alloy material.

20. The system of 14, wherein said system for generating an image is a system selected from the group consisting of:
a flatbed scanner, a printer, and a photocopier.

* * * * *